(12) United States Patent
Inagawa et al.

(10) Patent No.: US 9,162,647 B2
(45) Date of Patent: Oct. 20, 2015

(54) PRETENSIONER

(71) Applicant: ASHIMORI INDUSTRY CO., LTD., Osaka-shi, Osaka (JP)

(72) Inventors: Yasuhiro Inagawa, Settsu (JP); Hiroyuki Miyoshi, Settsu (JP)

(73) Assignee: ASHIMORI INDUSTRY CO., LTD., Osaka (JP)

( * ) Notice: Subject to any disclaimer, the term of this patent is extended or adjusted under 35 U.S.C. 154(b) by 0 days.

(21) Appl. No.: 14/374,256

(22) PCT Filed: Feb. 18, 2013

(86) PCT No.: PCT/JP2013/053868
§ 371 (c)(1),
(2) Date: Jul. 24, 2014

(87) PCT Pub. No.: WO2013/125487
PCT Pub. Date: Aug. 29, 2013

(65) Prior Publication Data
US 2015/0008718 A1  Jan. 8, 2015

(30) Foreign Application Priority Data

Feb. 23, 2012  (JP) ................................. 2012-037959
Feb. 23, 2012  (JP) ................................. 2012-037960

(51) Int. Cl.
*B60R 22/195* (2006.01)
*B60R 22/18* (2006.01)

(52) U.S. Cl.
CPC ............. *B60R 22/1955* (2013.01); *B60R 22/18* (2013.01); *B60R 22/1952* (2013.01); *B60R 2022/1806* (2013.01)

(58) Field of Classification Search
CPC ............ B60R 22/1955; B60R 22/1952; B60R 2022/1806; B60R 22/4628; B60R 22/195
See application file for complete search history.

(56) References Cited

U.S. PATENT DOCUMENTS 7,380,832 B2 * 6/2008 Gray et al. ..................... 280/806
7,976,066 B2 * 7/2011 Bok et al. ...................... 280/806
(Continued)

FOREIGN PATENT DOCUMENTS

JP  04-005148 A  1/1992
JP  06-040310 A  2/1994
(Continued)

OTHER PUBLICATIONS

International Search Report of PCT/JP2013/053868 dated Apr. 2, 2013.

*Primary Examiner* — Ruth Ilan
(74) *Attorney, Agent, or Firm* — Sughrue Mion, PLLC

(57) ABSTRACT

An object of the invention is to reduce the weight of a pretensioner by reducing the length of a piston and a wire of the pretensioner. A pretensioner (1) is used in a seat belt device and pulls a seat belt. Due to gas supplied into a cylinder (10) from a gas generator (4), a piston (20) is moved in the cylinder (10). A wire (60) is connected to the piston (20) and the seat belt and pulls the seat belt when the piston (20) moves. The wire (60) has both ends that are connected to the seat belt and has a folded portion (63) that is connected to the piston (20) via connecting means (51). The connecting means (51) has a connecting hole (24) that is formed in the piston (20) and through which the folded portion (63) passes and has a detachment preventing member (52) that is positioned between the folded portion (63) and the piston (20) to prevent the folded portion (63) from being detached from the connecting hole (24).

16 Claims, 10 Drawing Sheets

(56) References Cited

U.S. PATENT DOCUMENTS 8,678,510 B2 * 3/2014 Masutani .................. 297/480
2010/0176649 A1 * 7/2010 Kohama .................. 297/474

FOREIGN PATENT DOCUMENTS

| JP | 2009-096242 A | 5/2009 |
| JP | 2011-063177 A | 3/2011 |

* cited by examiner

FIG. 6
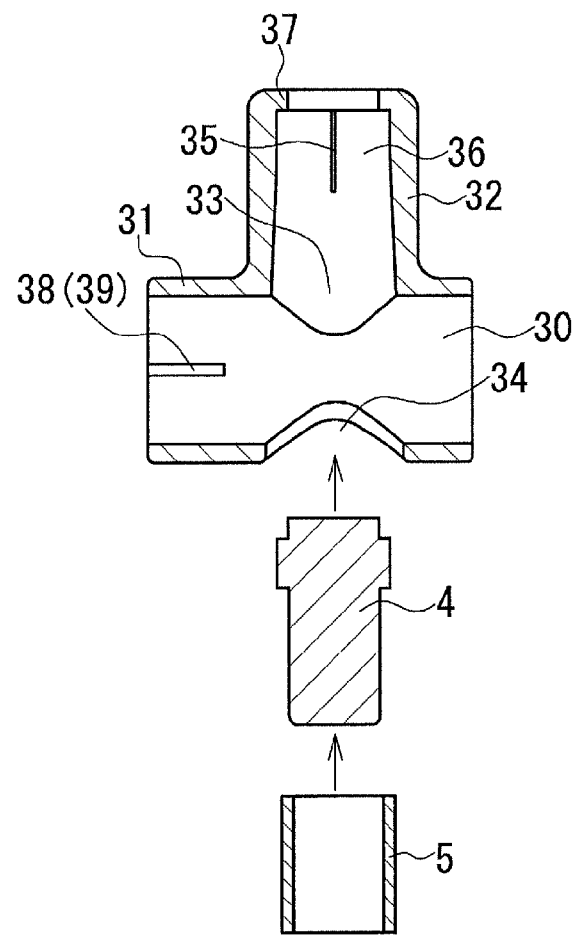
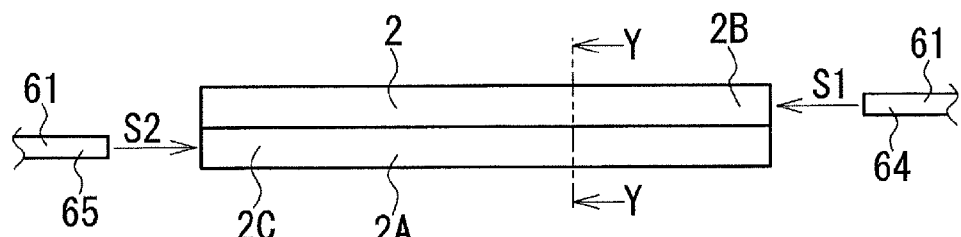
FIG. 7A
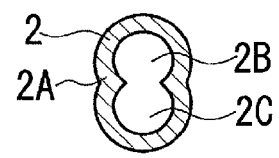
FIG. 7B

PRETENSIONER

CROSS REFERENCE TO RELATED APPLICATIONS

This is a National Stage of International Application No. PCT/JP2013/053868 filed Feb. 18, 2013, claiming priority based on Japanese Patent Application No. 2012-037959 filed Feb. 23, 2012 and Japanese Patent Application No. 2012-037960 filed Feb. 23, 2012, the contents of all of which are incorporated herein by reference in their entirety.

TECHNICAL FIELD

The present invention relates to a pretensioner used in a vehicle seat belt device.

BACKGROUND ART

In an emergency of a vehicle, a seat belt device stops paying out of a seat belt by means of a retractor. Furthermore, a pretensioner provided in the seat belt device pulls the seat belt. At this time, the pretensioner moves a piston in a cylinder to pull a wire with the piston, using gas generated by a gas generator. By pulling the seat belt with the wire, the seat belt is tightened. An occupant is restrained to a seat by the seat belt and is protected.

In a conventionally known pretensioner, a piston moving in a cylinder pulls a wire attached to a seat belt (see PTL 1).

In such a conventional pretensioner, one end of the wire is inserted into a hole in the piston and is fixed to the piston by a tubular wire end. At this time, by crushing the wire end, the wire end is fixed to the end of the wire. When the piston moves, the wire is pulled by the piston, and then pulls the seat belt.

When the pretensioner is activated, the wire needs to be reliably secured to the piston by the wire end. To achieve this, by increasing the length of the wire end (a portion to be crushed), the wire end is securely fixed to the end of the wire.

Therefore, in the conventional pretensioner, the length and weight of the piston, including the wire end, tend to increase in response to an increase in the holding power of the wire. Furthermore, because a length of a portion of the wire to be fixed to the wire end increases, the weight of the wire also increases. As a result, the cost of the pretensioner increases, and the weight of the pretensioner increases.

Furthermore, in the conventional pretensioners, typically, a gas generator generates high-temperature, high-pressure gas. In order to deal with this gas, the gas generator is accommodated in a thick-walled, heavy pressure container and is fixed to the pressure container by a cap. The pressure container is securely fixed to an end of the cylinder so as not to leak the gas. Furthermore, a base that supports the wire is fixed to the pressure container. The base is made of a strong, heavy member and is fixed to the pressure container with screws or by crimping.

Like this, the conventional pretensioner is made of a plurality of components including heavy components and components that are difficult to handle. These components of the pretensioner are machined (for example, screw machining) for fixing. By sequentially fixing the plurality of components with screws or by crimping, a pretensioner having a complex structure is assembled. Due to this assembly method, the assembly of pretensioner tends to require time and effort. Furthermore, because the assembly of the pretensioner is complex, the assembly man-hours and the cost of the pretensioner increase.

To counter this problem, a pretensioner that is composed of a reduced number of components by using a base cartridge having a plurality of functions is known (see PTL 2).

However, because the base cartridge is large and heavy, the handling of the base cartridge is difficult. Because this base cartridge needs to be fixed to a cylinder, the assembly of the pretensioner requires effort. Furthermore, similarly to the above, a gas generator is fixed to the base cartridge with a cap. Thus, the conventional pretensioner requires machining for fixing and complex assembly work, and, due to the complex structure of the base cartridge, the structure of the pretensioner also becomes complex.

CITATION LIST

Patent Literature

PTL 1: Japanese Unexamined Patent Application, Publication No. 2009-96242
PTL 2: Japanese Unexamined Patent Application, Publication No. 2011-63177

SUMMARY OF INVENTION

Technical Problem

The present invention has been made in view of the above-described conventional problems, and an object thereof is to reduce the weight of a pretensioner by reducing the lengths of a piston and a wire of the pretensioner.

Furthermore, another object of the present invention is to simplify the structure of the pretensioner, as well as to ease the assembly of the pretensioner.

Solution to Problem

The present invention is a pretensioner that is used in a vehicle seat belt device and pulls a seat belt, the pretensioner including a cylinder; a gas generator that supplies gas into the cylinder; a piston that is moved in the cylinder by the gas supplied from the gas generator; a wire that is connected to the piston and the seat belt and pulls the seat belt when the piston moves; and connecting means for connecting the wire to the piston. The wire has both ends that are connected to the seat belt and has a folded portion that is formed between the both ends and is connected to the piston. The connecting means includes a connecting hole that is formed in the piston and through which the folded portion of the wire passes, and includes a detachment preventing member positioned between the folded portion and the piston to prevent the folded portion from being detached from the connecting hole.

Furthermore, another invention is a pretensioner that is used in a vehicle seat belt device and pulls a seat belt, the pretensioner including a cylinder; a gas generator that supplies gas into the cylinder; a housing that is fitted to the cylinder and includes a tubular portion, which is fitted to the outer circumference of the cylinder, and a holding portion, which holds the gas generator, the tubular portion and the holding portion being formed as an integral part; a base including a fitting portion, which is fitted to the inner circumference of the cylinder, and a retaining portion, which retains the housing fitted to the cylinder, the fitting portion and the retaining portion being formed as an integral part; a fixing member that fixes the base to a vehicle body; a piston that is moved in the cylinder by the gas supplied from the gas generator; and a connecting member that connects the seat belt and the piston and pulls the seat belt when the piston moves.

Advantageous Effects of Invention

According to the present invention, the lengths of the piston and wire of the pretensioner can be reduced. Furthermore, the weight of the pretensioner can be reduced. Furthermore, it is possible to simplify the structure of the pretensioner, as well as to ease the assembly of the pretensioner.

BRIEF DESCRIPTION OF DRAWINGS

FIG. 6 is a cross-sectional view of a housing, gas generator, and collar.

FIG. 7 includes diagrams showing an anchor before being fixed to a wire.

DESCRIPTION OF EMBODIMENTS

An embodiment of a pretensioner of the present invention will be described with reference to the drawings.

The pretensioner according to this embodiment is used in a vehicle seat belt device and pulls a seat belt worn by an occupant.

Figure 1:
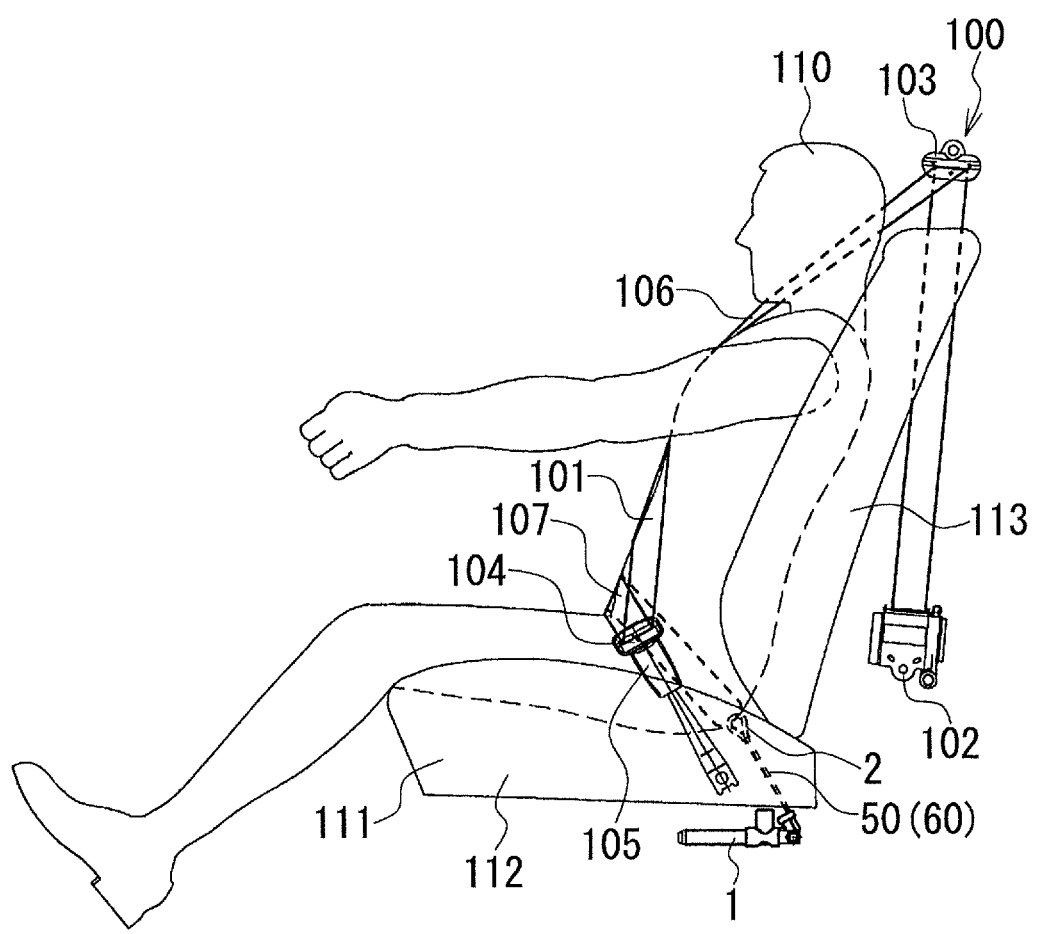
FIG. 1 is a side view showing a seat belt device including a pretensioner according to this embodiment.

FIG. 1 is a side view showing a seat belt device including the pretensioner according to this embodiment.

As shown in the figure, an occupant 110 is seated on a seat 111 and wears a seat belt device 100. The seat 111 includes a seat cushion 112 and a seat back 113. The seat belt device 100 is installed in a vehicle and is provided on the seat 111 (a driver's seat, a passenger's seat, rear seats, etc.).

The seat belt device 100 includes a pretensioner 1, a seat belt 101, a retractor 102, a seat belt guide 103, a tongue 104, and a buckle 105. The pretensioner 1 is disposed at a lower portion inside the vehicle and is fixed to a vehicle body (for example, a floor), at a side of the seat 111. The seat belt 101 is made of a long, belt-like member (webbing). The retractor 102 is a take-up device that takes up the seat belt 101 and is fixed to the vehicle body at the side of the seat 111.

An end of the seat belt 101 is attached to an anchor 2 of the pretensioner 1, at the side of the seat 111. The seat belt 101 passes through the seat belt guide 103, which is fixed to an upper portion inside the vehicle, between the pretensioner 1 and the retractor 102. The tongue 104 has a hole (not shown) through which the seat belt 101 passes. The buckle 105 has a lock mechanism (not shown) for locking the tongue 104 and is fixed to the vehicle body (for example, the floor), at a side of the seat 111 (the opposite side from the pretensioner 1). By inserting the tongue 104 into the buckle 105, the tongue 104 is locked into the buckle 105.

When the occupant 110 intends to fasten the seat belt 101, the occupant 110 pulls the seat belt 101 out of the retractor 102 and locks the tongue 104 into the buckle 105. The seat belt 101 has, in a state of being worn by the occupant 110, a shoulder belt 106 extending between the seat belt guide 103 and the tongue 104, and a lap belt 107 extending between the tongue 104 and the pretensioner 1. When the occupant 110 intends to unfasten the seat belt 101 the tongue 104 is unlocked by pressing a release button (not shown) on the buckle 105.

In an emergency of the vehicle, the retractor 102 stops paying out of the seat belt 101. The pretensioner 1 is activated when receiving an activation signal from an activation instruction portion (not shown). The activation instruction portion includes sensors (an impact detecting sensor, a deceleration detecting sensor, etc.) provided in the vehicle and outputs the activation signal to the pretensioner 1 when detecting an impact or deceleration. When activated, the pretensioner 1 pulls the end of the seat belt 101 to apply tension to the seat belt 101. As a result, the slack of the seat belt 101 is eliminated, and the seat belt 101 is tightened. The occupant 110 is restrained to the seat 111 by the seat belt 101 and is protected.

Next, a detailed description of the pretensioner 1 will be given.

Figure 2:
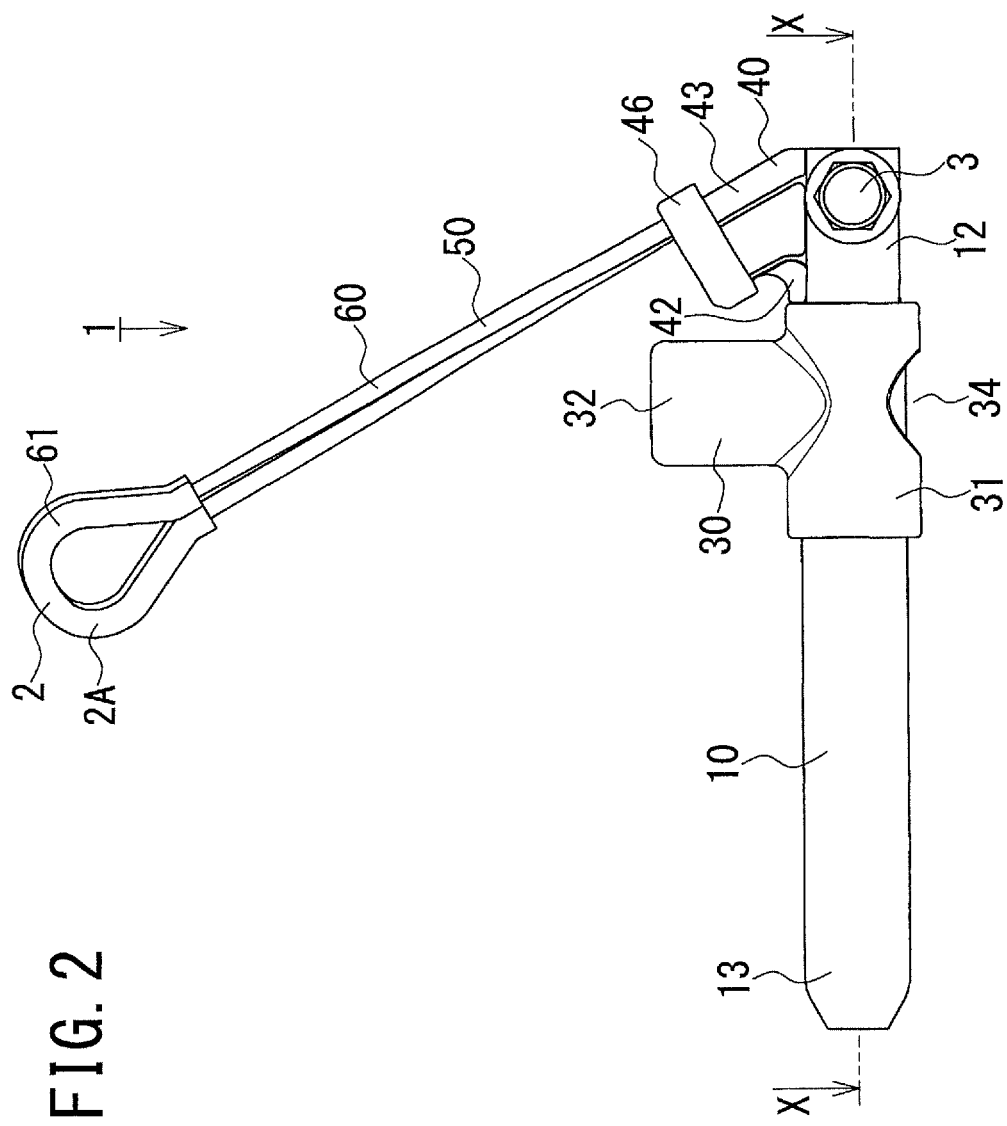
FIG. 2 is a side view of the pretensioner according to this embodiment.
Figure 3:
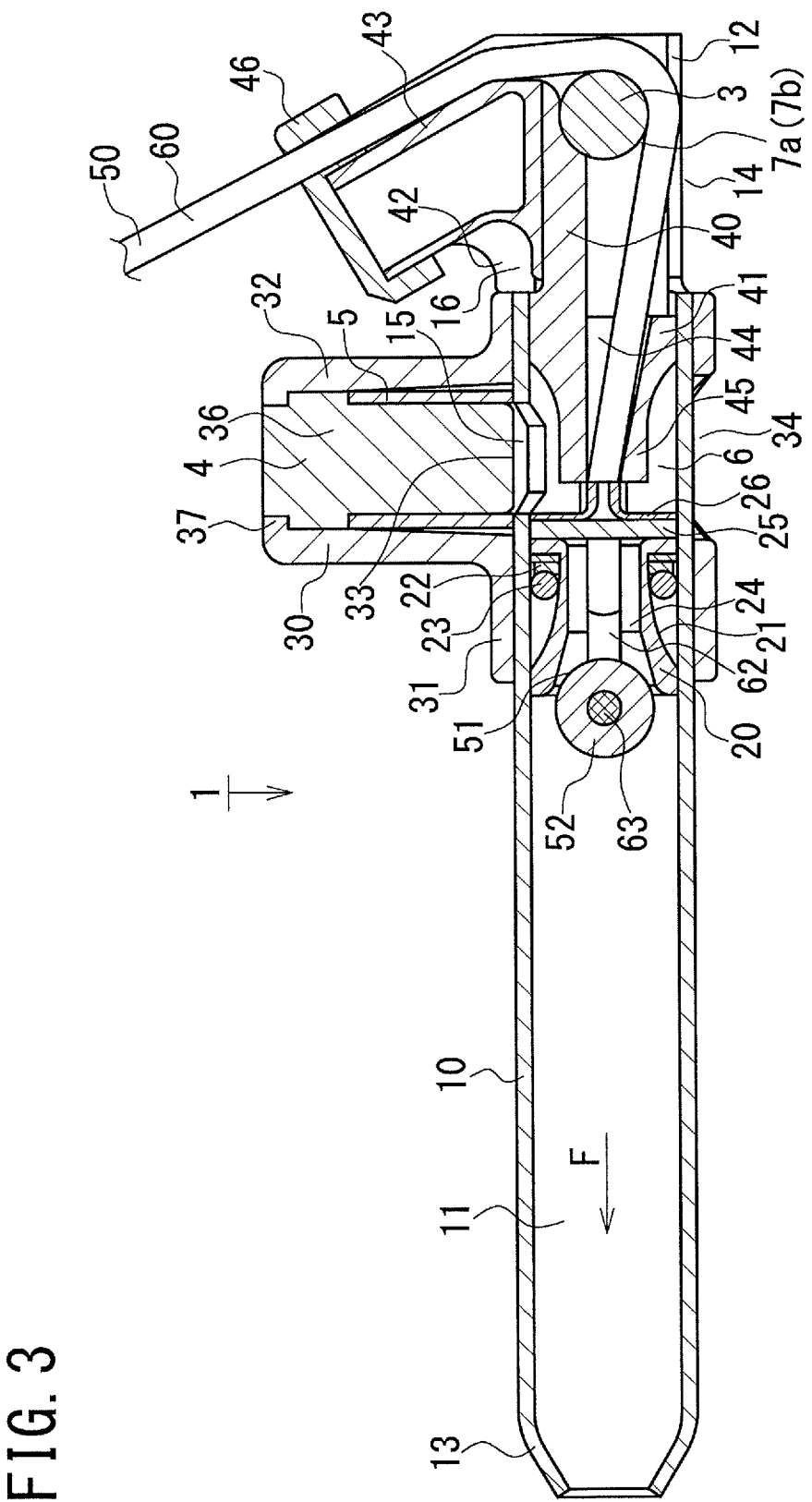
FIG. 3 is a cross-sectional view of the pretensioner shown in FIG. 2.
Figure 4:
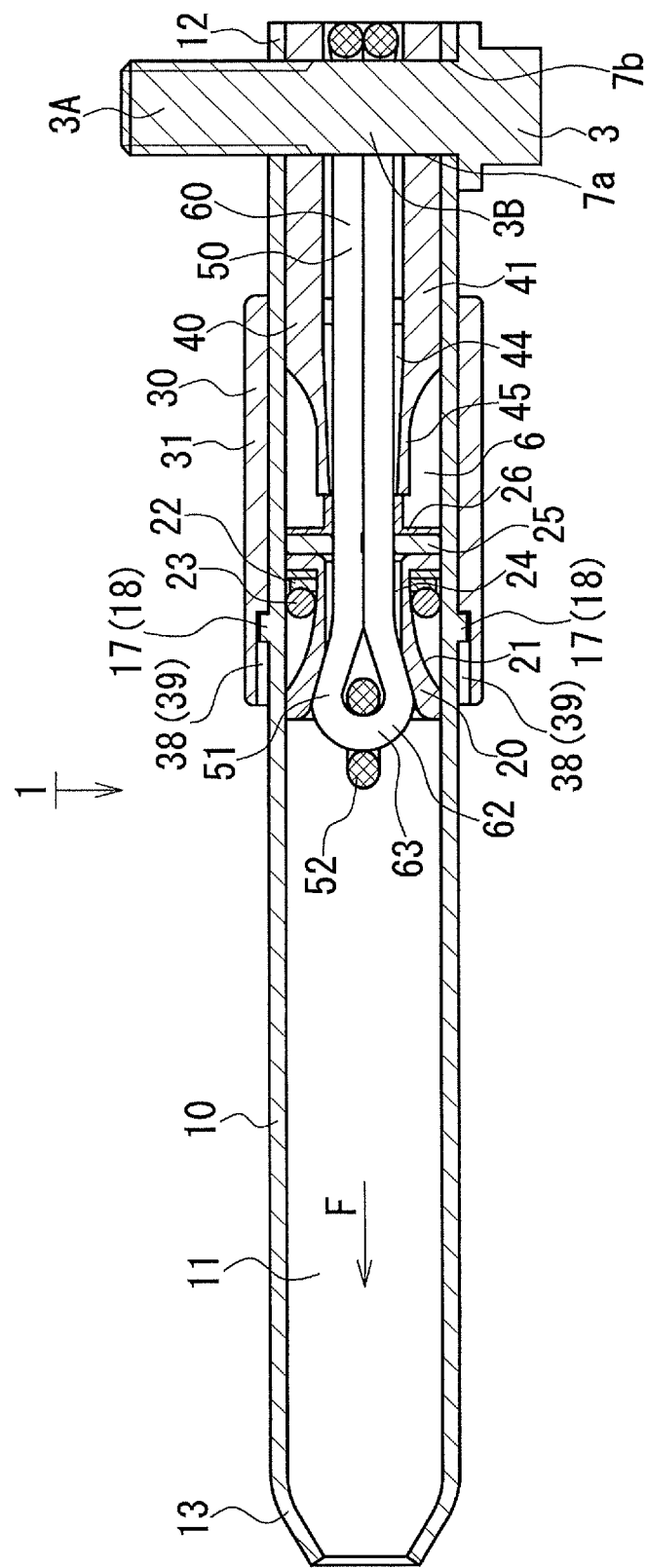
FIG. 4 is a cross-sectional view of the pretensioner, taken along line X-X in FIG. 2.
Figure 5:
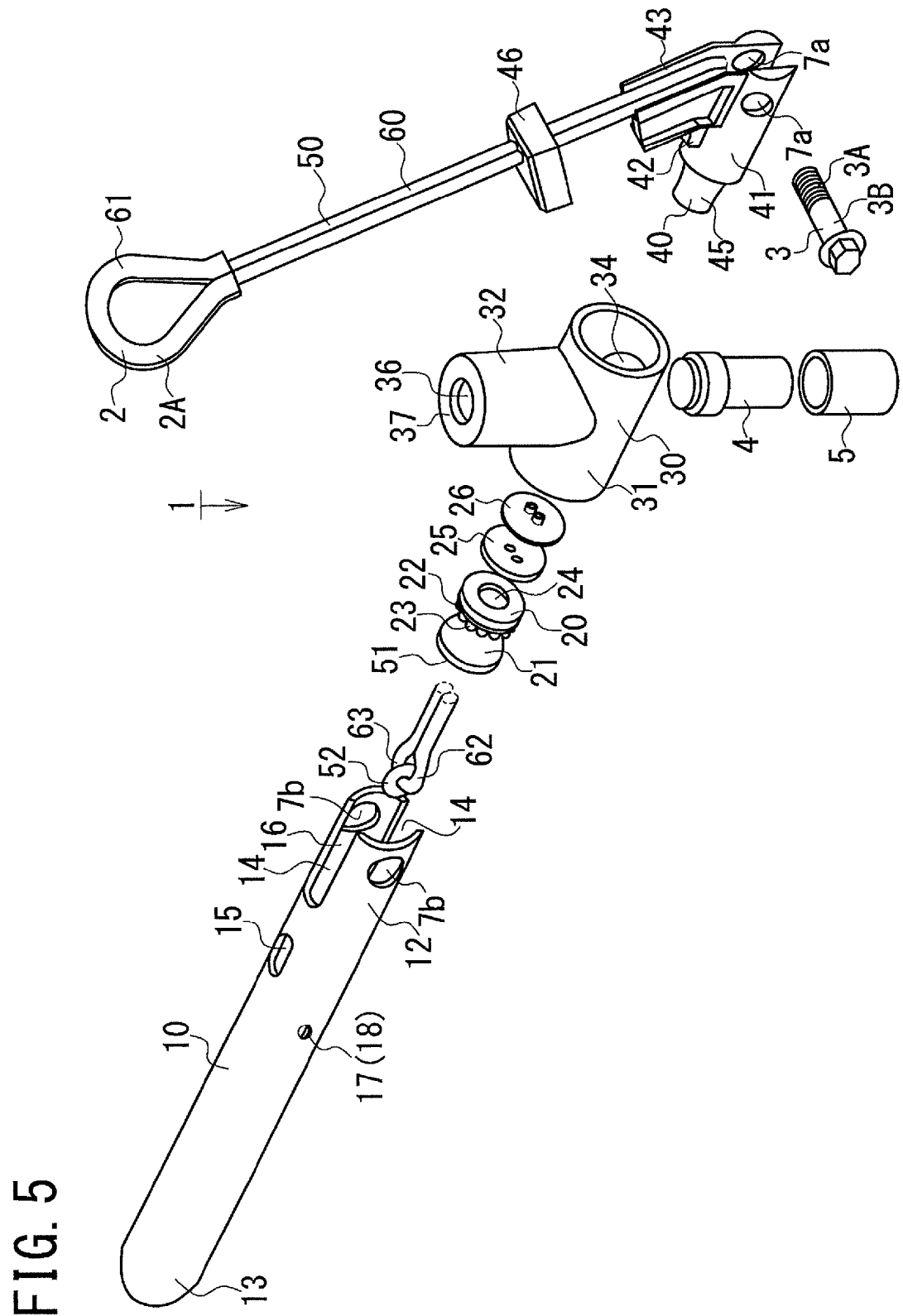
FIG. 5 is an exploded perspective view of the pretensioner.

FIG. 2 is a side view of the pretensioner 1. FIG. 3 is a cross-sectional view of the pretensioner 1 shown in FIG. 2. FIG. 4 is a cross-sectional view of the pretensioner 1, taken along line X-X in FIG. 2. FIG. 5 is an exploded perspective view of the pretensioner 1.

As shown in the figures, the pretensioner 1 includes a tubular cylinder 10, a piston 20, a housing 30, a base 40, and a fixing member 3. These components of the pretensioner 1 are made of metal in predetermined shapes, respectively. Furthermore, the pretensioner 1 includes a connecting member 50 and a gas generator 4.

The cylinder 10 is a pressure container formed in a cylindrical shape and has rectangular cut-out portions 14 and a gas inflow hole 15 formed at one end 12. An inside space 11 of the cylinder 10 communicates with the outside of the cylinder 10 via openings provided at the ends 12 and 13 of the cylinder 10. The one end 12 of the cylinder 10 is formed straight, and the other end 13 of the cylinder 10 is formed so as to be gradually narrowed toward an end face. The cut-out portions 14 are formed from the end face of the cylinder 10 to a predetermined position of the one end 12 and extend through the cylinder 10. The inflow hole 15 is provided in the cylinder 10, toward the one end 12 side, so as to extend through the cylinder 10. The gas flows into the cylinder 10 (inside space 11) through the inflow hole 15. Note that two cut-out portions 14 are provided such that the center line of the cylinder 10 is therebetween, and one of the cut-out portions 14 serves as a guide portion 16 for guiding the base 40.

The gas generator 4 includes an ignition device and a gas generating agent (not shown) and is disposed at the position of the inflow hole 15 via the housing 30. The ignition device ignites the gas generating agent, generating gas by the combustion of the gas generating agent. The gas generator 4 generates gas when receiving the activation signal and supplies gas into the cylinder 10 through the inflow hole 15. Due to the gas supplied from the gas generator 4, the piston 20 is moved in the cylinder 10, pulling the connecting member 50, and the connecting member 50 pulls the seat belt 101.

The housing 30 includes a tubular portion 31 and a holding portion 32, which are formed as an integral part so as to be perpendicular to each other. The tubular portion 31 is a tubular attaching portion that is formed so as to conform to the outer circumferential shape of the cylinder 10. By inserting the one end 12 of the cylinder 10 into the tubular portion 31, the tubular portion 31 is fitted to the outer circumference of the cylinder 10. The housing 30 is attached to the outer circumference of the cylinder 10 via the tubular portion 31. The holding portion 32 is formed in a tubular shape at the outer circumference of the tubular portion 31 and projects to a side of the tubular portion 31. The housing 30, with the gas generator 4 being held in the holding portion 32, is fitted to the outer circumference of the cylinder 10. The gas generator 4 is fixed inside the holding portion 32 by a tubular collar 5 and is held onto the outer circumference of the cylinder 10 by the holding portion 32.

FIG. 6 is a cross-sectional view of the housing 30, the gas generator 4, and the collar 5. FIG. 6 shows the housing 30, the gas generator 4, and the collar 5, in an exploded manner, corresponding to FIG. 3. Note that the tubular portion 31, the holding portion 32, and the collar 5 are formed in cylindrical shapes.

As shown in the figure, the housing 30 has an opening 33 of the holding portion 32, which opening 33 is formed in the inner circumference of the tubular portion 31. The opening 33 is provided in the inner surface of the tubular portion 31 that is fitted to the outer circumference of the cylinder 10. The inside of the holding portion 32 communicates with the inside of the tubular portion 31 via the opening 33.

The tubular portion 31 of the housing 30 has an insertion hole 34 into which the gas generator 4 is inserted. The insertion hole 34 is provided in the tubular portion 31, at a position facing the opening 33 of the holding portion 32. Herein, the insertion hole 34 is located on the opposite side of the center line of the tubular portion 31 from the opening 33. The gas generator 4 is inserted into the insertion hole 34 and is disposed in the holding portion 32 from the opening 33. The collar 5 is thrust between the holding portion 32 and the gas generator 4 through the insertion hole 34 and the opening 33. At this time, the collar 5 crushes a plurality of ribs 35 formed inside the holding portion 32, thereby fixing the gas generator 4 inserted into the holding portion 32.

The holding portion 32 of the housing 30 has an accommodating portion 36 that accommodates the gas generator 4 and has a retaining projection 37 that retains the gas generator 4. The accommodating portion 36 and the retaining projection 37 are formed in the holding portion 32. The gas generator 4 is inserted into the accommodating portion 36 from the opening 33 and is accommodated in the accommodating portion 36. The retaining projection 37 is formed in a circular shape at an end of the accommodating portion 36 and protrudes into the holding portion 32. When the gas generator 4 is inserted, an end of the gas generator 4 comes into contact with the retaining projection 37, and the gas generator 4 stops. The gas generator 4 is retained by the retaining projection 37 in a state of being disposed at a predetermined position inside the holding portion 32 (accommodating portion 36), and the gas generator 4 is held in the holding portion 32 (accommodating portion 36) by the retaining projection 37 when generating gas.

The housing 30 has grooves 38 in the inner surface. The grooves 38 are formed linearly from one end face of the tubular portion 31 to a predetermined position inside the tubular portion 31. Owing to the grooves 38 formed in the inner circumference of the tubular portion 31, the housing 30 is precisely fitted to the cylinder 10. Herein, two grooves 38 are formed along the center line of the tubular portion 31, such that the center line of the tubular portion 31 is therebetween.

The cylinder 10 (see FIGS. 4 and 5) has tab-like projections 17. The projections 17 are formed on the outer circumference of the cylinder 10 by pressing, so as to pinch, the outer surface of the cylinder 10. Herein, two projections 17 are formed such that the center line of the cylinder 10 therebetween, so as to correspond to the two grooves 38 in the housing 30. When the housing 30 is fitted to the cylinder 10, the projections 17 of the cylinder 10 are inserted into the grooves 38 in the housing 30. The grooves 38 guide the projections 17 and stop the projections 17 inside the tubular portion 31. That is, the projections 17 move along the grooves 38 while sliding in the grooves 38 and stop at ends of the grooves 38. By fitting the grooves 38 and the projections 17 together, the housing 30 is fitted to a predetermined position of the cylinder 10 and is prevented from rotating around the cylinder 10.

As has been described, the cylinder 10 and the housing 30 have a pair of positioning portions 18 and a pair of positioning portions 39 that are used to position the housing 30 to be fitted to the cylinder 10. The positioning portions 18 of the cylinder 10 are formed of the projections 17, which are positioning projections. By bringing the projections 17 into contact with the housing 30, the housing 30 is positioned. The positioning portions 39 of the housing 30 are formed of the grooves 38, which include a positioning groove and a guide groove. The pair of positioning portions 18 and the pair of positioning portions 39 fit together when the housing 30 is fitted to the cylinder 10. Herein, the pair of positioning portions 18 and the pair of positioning portions 39 fit together, respectively, thereby positioning the cylinder 10 and the housing 30 at two positions.

When the housing 30 (see FIGS. 2 to 5) is fitted to the cylinder 10, the insertion hole 34 in the housing 30 is closed by the outer circumferential surface of the cylinder 10, and the inflow hole 15 in the cylinder 10 overlaps the opening 33 of the holding portion 32. More specifically, the inflow hole 15 is provided in the outer circumference of the cylinder 10, at a position matching the opening 33 when the housing 30 is fitted to the cylinder 10. The opening 33 is a gas outflow port through which the gas generated by the gas generator 4 flows out. When the gas generator 4 generates gas, the gas flowing out of the opening 33 flows into the cylinder 10 through the inflow hole 15. The gas generator 4 directly supplies the gas into the cylinder 10 through the opening 33 and the inflow hole 15.

The piston 20 is a tubular member that is formed in a shape conforming to the inner circumferential shape of the cylinder 10 and has an inclined portion 21 formed on the outer circumference thereof. The piston 20 is disposed inside the cylinder 10 and is moved in the longitudinal direction (traveling direction F) of the cylinder 10, from the one end 12 to the other end 13 of the cylinder 10, by the gas supplied into the cylinder 10. The inclined portion 21 is a small-diameter portion that is formed between the ends (large-diameter portions) of the piston 20 and gradually increases in diameter in the traveling direction F of the piston 20.

An elastic ring 22 and a plurality of balls 23 are disposed on the inclined portion 21 of the piston 20. The elastic ring 22 is attached to a portion of the inclined portion 21 where the diameter is smallest. The plurality of balls 23 is accommodated in a space between the inclined portion 21 and the cylinder 10 and is disposed annularly around the inclined portion 21. Before fitting the housing 30 to the cylinder 10, the inclined portion 21 is disposed at the position of the inflow hole 15 in the cylinder 10, and the plurality of balls 23 is inserted into the cylinder 10 from the inflow hole 15. By pushing the piston 20 toward the other end 13 of the cylinder 10 in this state, the plurality of balls 23 is accommodated in the space between the inclined portion 21 and the cylinder 10. At the same time, the piston 20 is moved to the other end 13 side of the inflow hole 15, and is disposed at a predetermined position in the cylinder 10. The predetermined position is a position determined in the cylinder 10 where the piston 20 is disposed when the pretensioner 1 is assembled.

Before the pretensioner 1 is activated, the piston 20 is disposed at the predetermined position and is disposed near the housing 30 and the inflow hole 15. Before and after activation of the pretensioner 1, the inflow hole 15 is located between the piston 20 and the base 40. The gas is supplied from the inflow hole 15 to an inflow chamber 6 between the piston 20 and the base 40. The inflow chamber 6 is a space into which the gas to be supplied into the cylinder 10 flows and is a space delimited by the cylinder 10, the piston 20, and the base 40. The piston 20 slides in the cylinder 10 due to the pressure of the gas flowing into the inflow chamber 6 and stops at the other end 13 of the cylinder 10.

The connecting member 50 connects the seat belt 101 and the piston 20 and pulls the seat belt 101 when the piston 20 moves. Furthermore, the connecting member 50 includes a wire (wire rope) 60 and the anchor 2. The anchor 2 is provided at one end of the connecting member 50 and is attached to the seat belt 101. The other end of the connecting member 50 is connected to the piston 20 and is pulled in the traveling direction F when the piston 20 moves. In accordance with this, the connecting member 50 (wire 60) is drawn into the cylinder 10, pulling the seat belt 101.

The wire 60 includes a connecting portion (seat-belt connecting portion) 61 that is connected to the seat belt 101, and a connecting portion (piston connecting portion) 62 that is connected to the piston 20. The wire 60 is connected to the piston 20 and the seat belt 101 and pulls the seat belt 101 when the piston 20 moves. The seat-belt connecting portion 61 includes the both ends of the single wire 60 folded such that two wire segments extend side-by-side, and is connected to the seat belt 101 via the anchor 2. More specifically, the wire 60 is folded so as to bend at a portion between the both ends, and the both ends are connected to the seat belt 101. The anchor 2 is fixed to the seat-belt connecting portion 61, which includes the two ends (terminal ends) of the wire 60. The wire 60 is pulled by the piston 20 moving in the cylinder 10, pulling the seat belt 101 connected to the seat-belt connecting portion 61.

By folding the wire 60, a folded portion 63, in a U-shape or a circular shape, is formed between the both ends of the wire 60. The piston connecting portion 62 of the wire 60 is formed of the folded portion 63 and is connected to the piston 20 by connecting means 51 for connecting the wire 60 to the piston 20. The folded portion 63 is held by the piston 20, which moves in the cylinder 10, by the connecting means 51.

The connecting means 51 has a connecting hole 24 that is formed in the piston 20 and has a detachment preventing member 52 that is larger than the connecting hole 24. The connecting hole 24 is a hole extending through the center of the piston 20. The folded portion 63 is disposed so as to pass through the connecting hole 24, and an end of the folded portion 63 is disposed in front side of the piston 20 in the traveling direction F (i.e., on the opposite side of the piston 20 from the inflow chamber 6). The detachment preventing member 52 is disposed, at least, within the folded portion 63 and is disposed between the folded portion 63 and the piston 20. The detachment preventing member 52 is positioned between the folded portion 63 and the piston 20 and prevents the folded portion 63 from being detached from the connecting hole 24. Owing to the detachment preventing member 52 provided on the folded portion 63, the folded portion 63 is prevented from being detached. In this way, the folded portion 63 passes through the connecting hole 24 and is connected to the piston 20 by the detachment preventing member 52.

When the piston 20 moves, the detachment preventing member 52 is caught by an end face of the piston 20 or the inner surface of the connecting hole 24, and the folded portion 63 of the wire 60 is held by the detachment preventing member 52. The connecting hole 24 is formed so as to be gradually enlarged in the traveling direction F of the piston 20. As a result, the inner surface of the connecting hole 24 forms an inclined surface, and the connecting hole 24 gradually expands toward the side where the detachment preventing member 52 is disposed. Part of the folded portion 63 and a portion of the detachment preventing member 52 are disposed inside the connecting hole 24. An edge of the connecting hole 24 is formed in a smoothly curved, convex curved surface, so that the edge of the connecting hole 24 does not damage the wire 60. It is also prevented that the edge of the connecting hole 24 cuts any of strings of the wire 60 when the wire 60 is pulled by the activated pretensioner 1.

The detachment preventing member 52 is formed of a ring-like member provided around the wire 60 at the folded portion 63. In the assembly process, the wire 60 is made to pass through a hole in the detachment preventing member 52, and the detachment preventing member 52 is disposed on the folded portion 63. Thereafter, the both ends of the wire 60 are inserted into the connecting hole 24, and the wire 60 is lead out from the piston 20. By doing so, the detachment preventing member 52 is disposed so as to be in contact with the piston 20 and so as to fit the connecting hole 24.

A seal member 25 and a set plate 26 are attached to the end face of the piston 20 that is nearer to the inflow chamber 6. The seal member 25 and the set plate 26 each have two holes through which the both ends of the wire 60 pass. By crimping hole portions in the set plate 26, the set plate 26 is fixed to the wire 60. The seal member 25 is made of a disc-like elastic member and is disposed between the set plate 26 and the piston 20. The end face of the piston 20 is sealed by the seal member 25. After the wire 60 is connected to the piston 20, and the seal member 25 and the set plate 26 are attached to the piston 20, the anchor 2 is fixed to the both ends of the wire 60.

FIG. 7 includes diagrams showing the anchor 2 before being fixed to the wire 60. FIG. 7A is a front view of the anchor 2. FIG. 7B is a cross-sectional view of the anchor 2, taken along line Y-Y in FIG. 7A. FIG. 7A also shows part of ends 64 and 65 (seat-belt connecting portion 61) of the wire 60.

As shown in the figure, the anchor 2 is formed of a linearly extending tubular member 2A. The tubular member 2A is an aluminum tube having a predetermined cross-sectional shape formed by, for example, extrusion forming and has two side-by-side hollow portions 2B and 2C. The hollow portions 2B and 2C each have a hole extending through the tubular member 2A in the longitudinal direction.

The two ends 64 and 65 of the wire 60 are inserted into the different hollow portions 2B and 2C from the opposite ends (end faces) of the tubular member 2A, respectively. More specifically, one end, 64, of the wire 60 is inserted into one of the hollow portions, 2B, from one end of the tubular member 2A (as indicated by an arrow S1 in FIG. 7A). The other end, 65, of the wire 60 is inserted into the other hollow portion 2C from the other end of the tubular member 2A (as indicated by an arrow S2 in FIG. 7A). The ends 64 and 65 of the wire 60 are inserted until they reach the opposite ends of the tubular member 2A and are disposed side-by-side in the tubular member 2A. By crimping the tubular member 2A in this state, the tubular member 2A is fixed to the ends 64 and 65 (seat-belt connecting portion 61) of the wire 60.

The seat-belt connecting portion 61 of the wire 60 is, in a state being inserted into the tubular member 2A, fixed to the tubular member 2A. Furthermore, the tubular member 2A is bent with the seat-belt connecting portion 61 of the wire passing therethrough and is formed in a loop shape, together with the seat-belt connecting portion 61, by bending deformation. The loop shape includes shapes that allow another member to pass therethrough (for example, a circular shape, a U shape, an arc shape, and a curved shape). By passing one end of the seat belt 101 through the tubular member 2A and sewing the end, the seat belt 101 can be attached to the tubular member 2A (anchor 2). The tubular member 2A covers the seat-belt connecting portion 61 of the wire 60 and is attached to the seat belt 101.

The base 40 (see FIGS. 2 to 5) has a fitting portion 41, a retaining portion 42, and a guide portion 43, which are formed as an integral part, and is attached to the inner circumference of the cylinder 10 at the one end 12. The fitting portion 41 is formed of a columnar member that is formed so as to conform to the inner circumferential shape of the cylinder 10. The fitting portion 41 is inserted into the cylinder 10 and is fitted to the inner circumference of the cylinder 10. The one end 12 of the cylinder 10 is closed by the fitting portion 41 fitted to the one end 12 of the cylinder 10.

The fitting portion 41 of the base 40 has a passing hole 44 and a protecting portion 45 and faces the piston 20 inside the cylinder 10. The passing hole 44 is a hole through which the folded wire 60 can pass and is formed in such a shape that the middle portion is narrowed so as to conform to a cross-sectional shape of the two segments of the wire 60 extending side-by-side. The both ends 64 and 65 of the wire 60 are inserted into the passing hole 44 and are lead out from the passing hole 44 before the anchor 2 is fixed to the wire 60. Furthermore, when the pretensioner 1 is activated, the wire 60 is drawn into the cylinder 10 through the passing hole 44.

The protecting portion 45 is a tapered portion formed at a distal end of the fitting portion 41 and is disposed inside the cylinder 10 so as to match the position of the inflow hole 15. The protecting portion 45 is disposed at a position subjected to the gas supplied from the gas generator 4 and receives the gas supplied into the cylinder 10. The wire 60 is, inside the cylinder 10 (inflow chamber 6), covered by the protecting portion 45 and is protected by the protecting portion 45 from the gas. The gas strikes the protecting portion 45 and is then guided toward the piston 20 by the protecting portion 45. At the distal end portion of the protecting portion 45, the distance of the gap between the passing hole 44 and the wire 60 is set such that the outflow of the gas can be suppressed. Thus, the gas is prevented from blowing out of the passing hole 44.

The retaining portion 42 of the base 40 is formed of a projection formed on the fitting portion 41 and moves inside the cut-out portion 14 (guide portion 16) in the cylinder 10 when the fitting portion 41 is inserted into the cylinder 10. The guide portion 16 of the cylinder 10 guides the retaining portion 42 until the retaining portion 42 comes into contact with the housing 30 fitted to the cylinder 10. The retaining portion 42 comes into contact with an end of the housing 30 and retains the housing 30 fitted to the cylinder 10. Owing to the retaining portion 42, the housing 30 is mounted on the cylinder 10, and hence, movement of the housing 30 and detachment of the housing 30 from the cylinder 10 are prevented.

The guide portion 43 of the base 40 projects in a direction where the seat belt 101 is located. The connecting member 50 (wire 60) is disposed so as to be in contact with the outer surface (guide surface) of the guide portion 43 and is guided to the seat belt 101 by the guide portion 43. A holding member 46 is attached to the base 40 and holds the wire 60 along the base 40. More specifically, the wire 60 passes through a hole provided in the holding member 46, and the holding member 46 is attached to a distal end of the guide portion 43. Owing to the holding member 46, the wire 60 is precisely disposed at a predetermined position of the base 40 and is held to the base 40 so as to extend along the guide portion 43.

The base 40 is attached to the cylinder 10 and is then fixed to the vehicle body with the fixing member 3. At this time, the fixing member 3 is inserted through through-holes 7a and 7b provided in the base 40 and the cylinder 10. The through-holes 7a and 7b align together, across the base 40 and the cylinder 10 when the fitting portion 41 of the base 40 is fitted to the inner circumference of the cylinder 10. More specifically, the base 40 has the through-holes 7a that are formed in the fitting portion 41 and into which the fixing member 3 is inserted. Furthermore, the cylinder 10 has the through-holes 7b that overlap the through-holes 7a in the base 40 when the fitting portion 41 is fitted to the inner circumference of the cylinder 10. The through-holes 7b in the cylinder 10 are formed at the one end 12 of the cylinder 10 and extend through side surfaces of the cylinder 10.

The fixing member 3 is a bolt and passes through the through-holes 7a and 7b in the base 40 and the cylinder 10 to attach the base 40 and the cylinder 10 to the vehicle body. Furthermore, the fixing member 3 has a screw portion 3A formed at a distal end and a cylindrical support portion 3B that supports the wire 60. When the screw portion 3A is fixed to a screw portion of the vehicle body, the support portion 3B is disposed inside the pretensioner 1. The base 40 and the cylinder 10 are joined (fixed) together by the fixing member 3 and are simultaneously fixed to the vehicle body. Furthermore, due to the retaining portion 42 retaining the housing 30, the housing 30 is fixed to the cylinder 10.

The wire 60 is bent around the fixing member 3 (support portion 3B) and is supported by the fixing member 3. The fixing member 3 is disposed between the seat-belt connecting portion 61 (ends 64 and 65) and the piston connecting portion 62 (folded portion 63) of the wire 60. When the pretensioner 1 is activated, the wire 60, which is bent at the position of the fixing member 3, is subjected to a force exerted by the piston 20 and the seat belt 101. This force is, for example, a force exerted by the wire 60 pulling the seat belt 101 and a force applied to the seat belt 101 by the occupant 110. The fixing member 3 supports, via the support portion 3B, the wire 60 that pulls the seat belt 101, while directly receiving the force applied to the wire 60. The wire 60, in a bent state, is supported between the piston 20 and the seat belt 101 by the fixing member 3.

Figure 8:
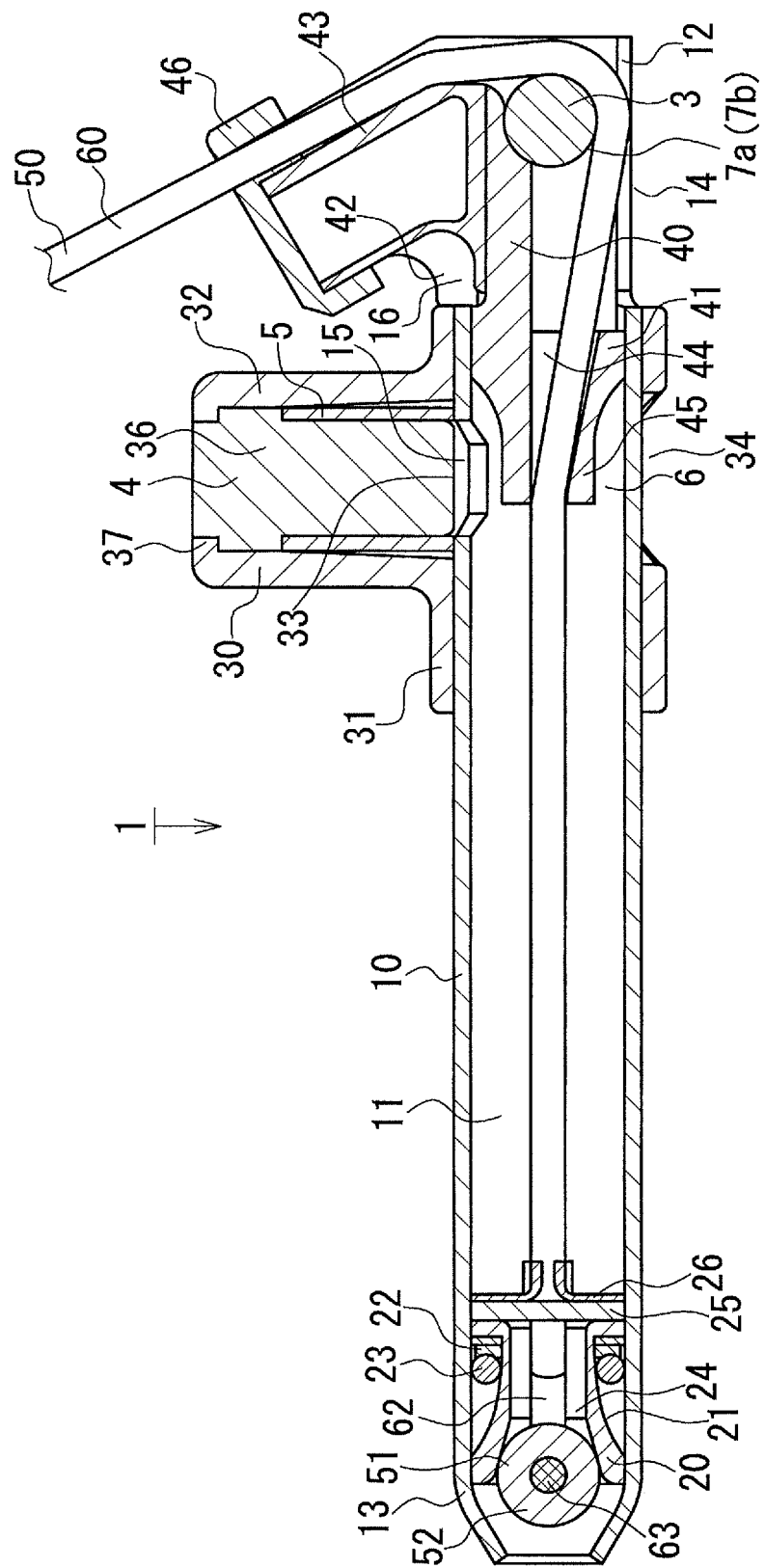
FIG. 8 is a cross-sectional view showing the pretensioner after activation.
Figure 9:
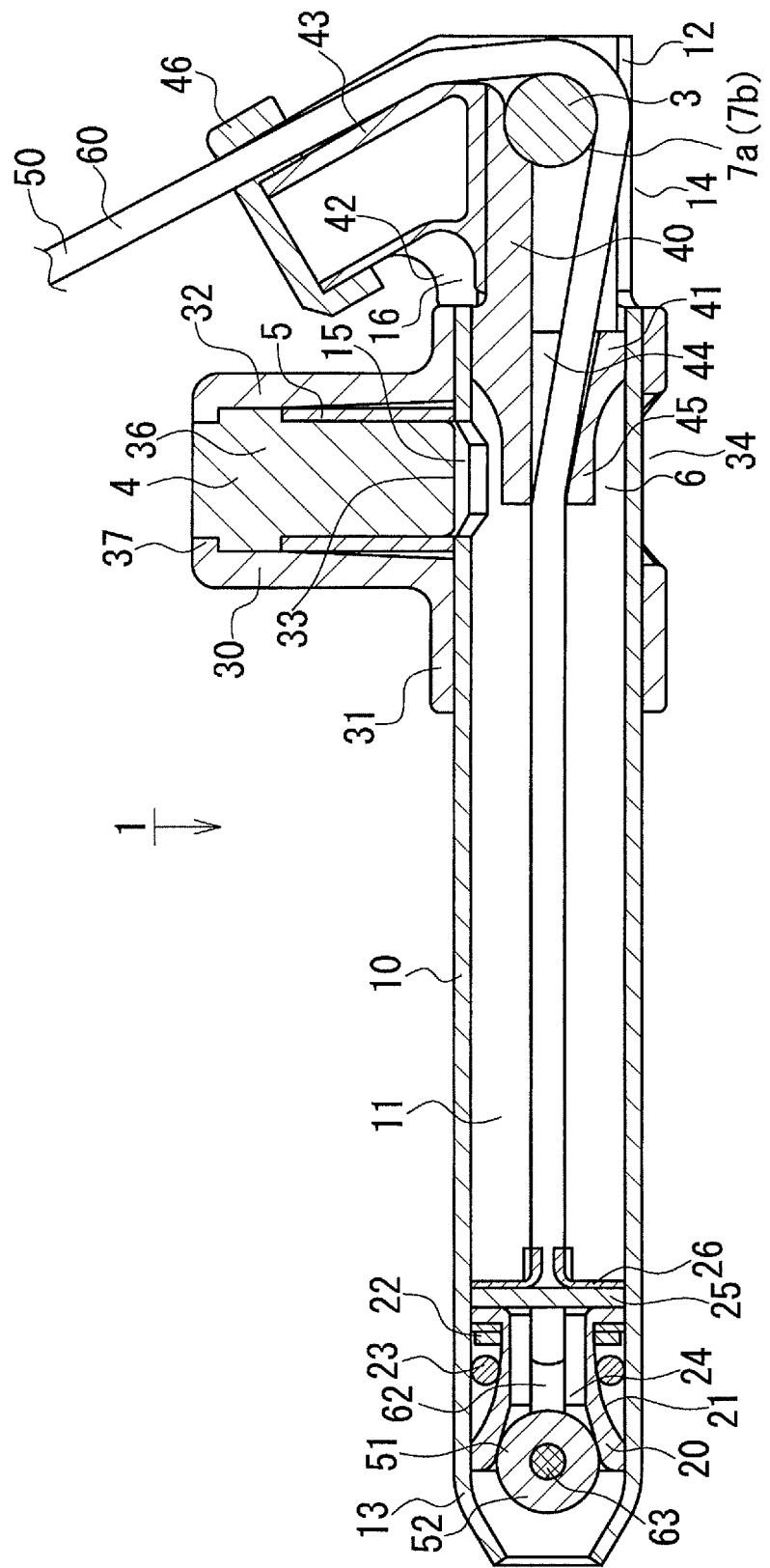
FIG. 9 is a cross-sectional view showing the pretensioner after activation.

FIGS. 8 and 9 are cross-sectional views corresponding to FIG. 3, showing the pretensioner 1 after activation.

When the pretensioner 1 is activated (see FIG. 8), the piston 20 is moved to the other end 13 through the cylinder 10, due to the gas generated by the gas generator 4. In accordance with the movement of the piston 20, the wire 60 (connecting member 50) is pulled by the piston 20 and then pulls the seat belt 101.

When the occupant 110 moves toward the front side of the vehicle, the seat belt 101, which is subjected to a force exerted by the occupant, pulls the wire 60 and the piston 20. At this time, the piston 20 (see FIG. 9) slightly moves in a pulling direction by the wire 60, sandwiching the plurality of balls 23 between the inclined portion 21 of the piston 20 and the inner circumferential surface of the cylinder 10. This stops the movement of the piston 20, preventing the wire 60 from being drawn out of the cylinder 10.

As has been described above, in the pretensioner 1 according to this embodiment, the folded portion 63 of the wire 60 is connected to the piston 20 by means of the connecting hole 24 and the detachment preventing member 52. Hence, the wire 60 can be easily connected to the piston 20. As a result, the assembly of the pretensioner 1 becomes easy, and the cost needed for the assembly of the pretensioner 1 can be reduced. By holding the folded portion 63 with the detachment preventing member 52, the wire 60 can be reliably secured to the piston 20. Furthermore, because the lengths of the piston 20 and the wire 60 (piston connecting portion 62) can be reduced, the costs of the piston 20 and the wire 60 can also be reduced. Because the weights of the piston 20 and the wire 60 are reduced, the weight of the pretensioner 1 can be reduced. Because the overall length of the cylinder 10 is reduced corresponding to the length of the piston 20, the weight of the cylinder 10 can also be reduced.

Because the connecting hole 24 in the piston 20 is formed so as to be gradually enlarged, part of the folded portion 63 of the wire 60 is disposed inside the connecting hole 24. Thus, the length of the folded portion 63 located outside the connecting hole 24 can be reduced. Furthermore, because the curvature of the folded portion 63 increases, situations in which the wire 60 is untwisted or in which any of strings of the wire 60 is broken can be prevented. Because the detachment preventing member 52 is formed of the ring-like member provided around the wire 60, the detachment preventing member 52 can be easily attached to the folded portion 63. By using the ring-like detachment preventing member 52, it is possible to prevent the detachment preventing member 52 from coming off from the folded portion 63 and to reliably hold the folded portion 63. Note that the detachment preventing member 52 may be a member having a shape other than the ring-like shape, and it may be, for example, a block-like member or a pin-like member disposed between the folded portion 63 and the piston 20.

Because the anchor 2 is formed of the tubular member 2A through which the seat-belt connecting portion 61 of the wire 60 passes, the structure of the anchor 2 can be simplified. Furthermore, it is possible to reduce the size of the anchor 2, as well as to easily manufacture the anchor 2. The anchor 2 formed of the tubular member 2A has a simple shape, but it provides high strength.

Concerning the pretensioner 1 installed in the vehicle, when the length between the holding member 46 and the seat belt 101 is limited, the smaller the anchor 2 is, the longer the length of the wire 60 between the holding member 46 and the anchor 2 is. In this embodiment, because the size of the anchor 2 can be reduced, the length of the wire 60 between the holding member 46 and the anchor 2 can be increased. As a result, the length of the wire 60 to be drawn into the cylinder 10 can be increased.

By fixing the seat-belt connecting portion 61 to the inside of the tubular member 2A, the seat-belt connecting portion 61 can be securely fixed to the anchor 2. Because the lengths of the tubular member 2A and the seat-belt connecting portion 61 only need to be such that the seat-belt connecting portion 61 does not come off from the tubular member 2A, the lengths of the tubular member 2A and the seat-belt connecting portion 61 can be reduced. As a result, the length and size of the anchor 2 can be reduced, and thus, the weight of the anchor 2 can be reduced.

In a state in which the pretensioner 1 is installed in the vehicle, the length of the wire 60 between the holding member 46 and the anchor 2 needs to be larger than the length of the wire 60 to be drawn into the cylinder 10. On the other hand, when the length of the wire 60 between the holding member 46 and the anchor 2 is sufficiently ensured, the overall length of the wire 60 can be further reduced by reducing the length of the seat-belt connecting portion 61, while ensuring the length of the wire 60 to be drawn into. In this embodiment, because the length of the seat-belt connecting portion 61 can be reduced, the length of the wire 60 can be reduced, thereby reducing the weight of the wire 60. Accordingly, it is possible to reduce the weight of the pretensioner 1, as well as to reduce the overall length of the pretensioner 1. Because the manufacturing cost of the anchor 2, the material cost of the anchor 2, and the material cost of the wire 60 are reduced, the cost of the pretensioner 1 can be reduced.

Because the tubular member 2A and the seat-belt connecting portion 61 are formed in loop shapes by bending deformation, the anchor 2 can be easily formed. Because the tubular member 2A is fixed to the seat-belt connecting portion 61 by crimping, the seat-belt connecting portion 61 can be reliably and securely fixed to the anchor 2. Because the two ends 64 and 65 of the wire 60 are inserted into the hollow portions 2B and 2C, respectively, from the opposite ends of the tubular member 2A, the ends of the tubular member 2A can be uniformly pulled by the wire 60.

By increasing the curvature of the tubular member 2A after the bending deformation, the seat belt 101 can be easily inserted through the anchor 2. It also makes the seat belt 101 difficult to tear at the part in contact with the tubular member 2A. Also by forming a straight portion in the anchor 2 and attaching the seat belt 101 to this straight portion, the force applied to the seat belt 101 is uniformly distributed, making the seat belt 101 less likely to tear. Note that the two ends 64 and 65 of the wire 60 may be inserted into the hollow portions 2B and 2C from the same end of the tubular member 2A. Furthermore, the seat-belt connecting portion 61 may be formed of a portion other than the ends 64 and 65 of the wire 60. In such a case, the wire 60 is inserted into the tubular member 2A such that the seat-belt connecting portion 61 is located inside the tubular member 2A.

By combining the gas generator 4, the housing 30, the cylinder 10, the base 40, etc., the pretensioner 1 is assembled. At this time, as has been described, because the components of the pretensioner 1 are easily combined, the pretensioner 1 can be easily assembled. Furthermore, because the time and effort required to assemble the pretensioner 1 are reduced, the man-hours required to assemble the pretensioner 1 and the cost of the pretensioner 1 can also be reduced. The assembled pretensioner 1 can be easily fixed to the vehicle body by using the fixing member 3 for fixing the base 40. By combining these components, the structure of the pretensioner 1 can be simplified.

Because screw machining required to combine the components becomes unnecessary, the costs of the components can be reduced. Because the gas generator 4 is held in the holding portion 32 of the housing 30, the gas generator 4 can be easily held inside the pretensioner 1. This pretensioner 1 can not only reduce the number of components, but also reduce the overall weight. By guiding the retaining portion 42 of the base 40 by the guide portion 16 of the cylinder 10, the retaining portion 42 can be precisely disposed with respect to the housing 30. When the pretensioner 1 is activated, the wire 60 can be reliably supported by the fixing member 3. Because the force applied to the wire 60 is received by the fixing member 3, the base 40 can be less strong than conventional bases. Therefore, the base 40 may be formed from a material (for example, aluminum alloy or synthetic resin) that is less strong than the material of the conventional bases.

Because the base 40 and the cylinder 10 can be simultaneously fixed to the vehicle body with the fixing member 3, the pretensioner 1 can be easily attached to the vehicle body. Because the base 40 and the cylinder 10 are joined together by the fixing member 3 when the fixing member 3 is attached to the vehicle body, the base 40 and the cylinder 10 can be easily and securely joined together. The strength of the pretensioner 1 is ensured by the fixing member 3 and the cylinder 10, and the gas directly flows into the cylinder 10 through the inflow hole 15. Therefore, the housing 30 does not need to be a pressure container. Because the strength of the housing 30 can be reduced, the housing 30 may be formed from a material that is less strong than the material of conventional housings, or the housing 30 may be formed to have a thinner wall than the conventional housings. Because the pair of positioning portions 18 and the pair of positioning portions 39 (projections 17 and the grooves 38) are provided in the housing 30 and the cylinder 10, the housing 30 can be precisely fitted to the cylinder 10.

By changing the position of the inflow hole 15, the position of the gas generator 4 (holding portion 32 of the housing 30) can be set to a desired position on the outer circumference of the cylinder 10. Therefore, the gas generator 4 can be disposed at a desired position in a circumferential direction of the cylinder 10. Furthermore, it is easy to adapt to layouts and attaching positions of the pretensioner 1 that vary depending on vehicles.

When the position of the gas generator 4 is changed, the positions of the inflow hole 15 and the positioning portions 18 (projections 17) of the cylinder 10 are changed according to the position of the gas generator 4. At this time, the positions of the inflow hole 15 and the positioning portions 18 are changed while maintaining the positional relationship between the inflow hole 15 and the positioning portions 18. The inflow hole 15 and the positioning portions 18 are formed on in the cylinder 10, at positions after the change. By doing so, the housing 30 can be fitted to the cylinder 10, without changing the positions of the opening 33 and the positioning portions 39 (grooves 38) of the housing 30. Because the same housing 30 can be used even when the position of the gas generator 4 is changed, the position of the gas generator 4 can be easily changed. Furthermore, because it is only necessary that the positions of the inflow hole 15 and the positioning portions 18 are changed, an increase in cost associated with the change of the position of the gas generator 4 can be suppressed.

Next, a detachment preventing member according to another embodiment will be described.

Figure 10:
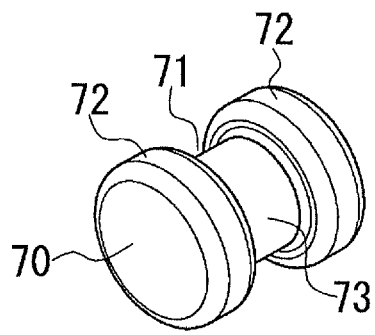
FIG. 10 is a perspective view showing a detachment preventing member according to another embodiment.
Figure 11A:
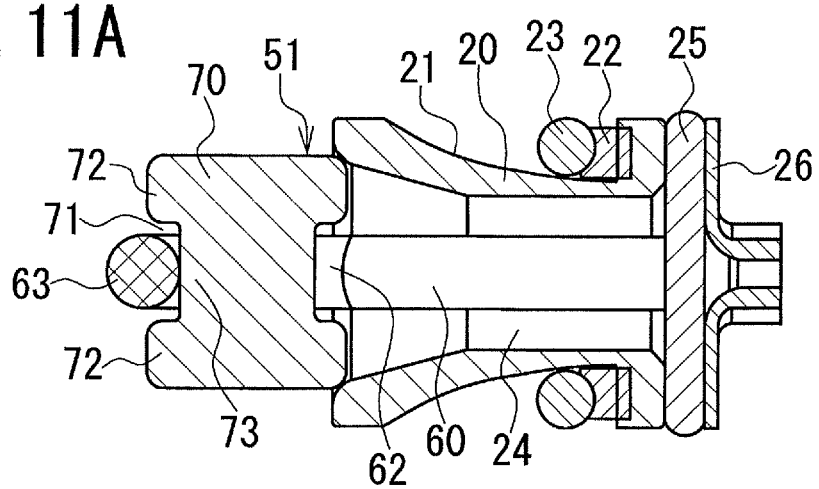
FIG. 11 includes diagrams showing the detachment preventing member disposed on a folded portion of the wire.
Figure 11B:
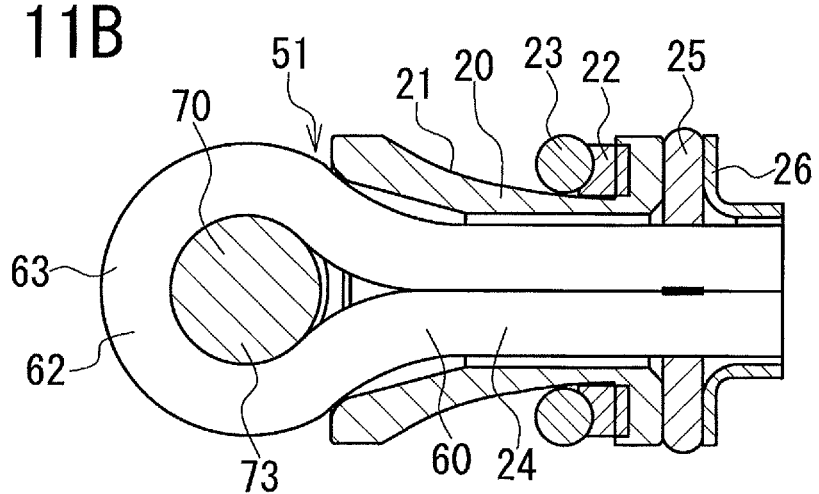

FIG. 10 is a perspective view showing a detachment preventing member 70 according to another embodiment. FIG. 11 includes diagrams showing the detachment preventing member 70 disposed on the folded portion 63 of the wire 60. FIG. 11A is a cross-sectional view corresponding to FIG. 3, and FIG. 11B is a cross-sectional view corresponding to FIG. 4. FIG. 11 show only the piston 20 and its vicinity.

As shown in the figure, the detachment preventing member 70 is formed of an inside member that is disposed inside the folded portion 63. The folded portion 63 of the wire 60 is disposed around the detachment preventing member 70 and is held by the piston 20 through the detachment preventing member 70. The detachment preventing member 70 includes an annular concave portion 71 in which the folded portion 63 is disposed, and a pair of wall portions 72 located on both sides of the annular concave portion 71. The annular concave portion 71 is a concave portion formed in the outer circumference of the cylindrical detachment preventing member 70 and has an annular shape. The pair of wall portions 72 is a side wall of the annular concave portion 71 and is formed in a disc-like shape. In this detachment preventing member 70, the portion between the pair of wall portions 72 serves as the annular concave portion 71. Furthermore, the detachment preventing member 70 between the pair of wall portions 72 constitutes a small-diameter portion 73 that has a smaller diameter than the pair of wall portions 72.

When the detachment preventing member 70 is set on the folded portion 63 of the wire 60, the detachment preventing member 70 is disposed inside the folded portion 63 passing through the connecting hole 24. In this state, the wire 60 is pulled to move the folded portion 63 and the detachment preventing member 70 toward the piston 20. As a result, the pair of wall portions 72 comes into contact with the piston 20 and is caught by the end face of the piston 20 or the inner surface of the connecting hole 24. The folded portion 63 is disposed in the annular concave portion 71 (small-diameter portion 73) and between the pair of wall portions 72. The detachment preventing member 70 is positioned between the folded portion 63 and the piston 20, preventing the folded portion 63 from being detached from the connecting hole 24. The folded portion 63 passes through the connecting hole 24 and is connected to the piston 20 by the detachment preventing member 70.

This detachment preventing member 70 can easily connect the folded portion 63 of the wire 60 to the piston 20. Furthermore, because the folded portion 63 is disposed inside the annular concave portion 71, the folded portion 63 can be prevented from coming off from the detachment preventing member 70. As a result, the folded portion 63 can be reliably held by the detachment preventing member 70. Because the pair of wall portions 72 prevents the folded portion 63 from moving outside the annular concave portion 71, the folded portion 63 can be more stably supported by the detachment preventing member 70.

In the above-described embodiment (see FIG. 1), the connecting member 50 (wire 60) is directly connected to the seat belt 101 by the anchor 2 that is directly attached to the seat belt 101. Due to the pretensioner 1 pulling one end of the seat belt 101, the seat belt 101 is tightened. Alternatively, it is also possible that the pretensioner 1 pulls the seat belt 101 via the buckle 105 to tighten the seat belt 101.

Figure 12:
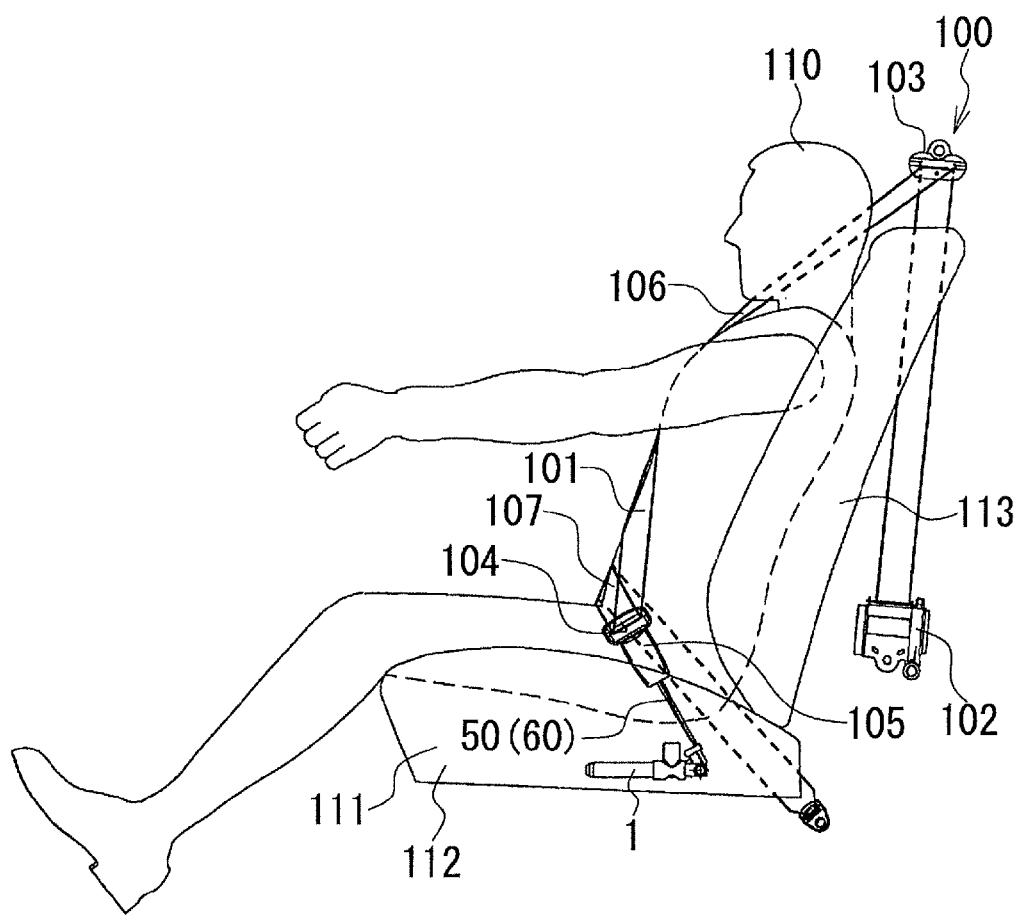
FIG. 12 is a diagram showing a pretensioner pulling a buckle.

FIG. 12 is a diagram showing the pretensioner 1 that pulls the buckle 105.

Herein, as shown in the figure, one end of the seat belt 101 is fixed to the vehicle body, and the pretensioner 1 is attached to the buckle 105. The buckle 105 is fixed to the anchor 2 with a bolt passing through the anchor 2 (not shown in FIG. 12). Thus, the anchor 2 is attached to the seat belt 101 via the buckle 105 and the tongue 104, and the wire 60 is connected to the seat belt 101. The pretensioner 1 pulls the buckle 105, the tongue 104, and the seat belt 101 by means of the wire 60. In this manner, the anchor 2 may be indirectly attached to the seat belt 101, and the wire 60 (connecting member 50) may be indirectly connected to the seat belt 101.

REFERENCE SIGNS LIST

1: pretensioner,
2: anchor,
2A: tubular member,
2B, 2C: hollow portion,
3: fixing member,
3A: screw portion,
3B: support portion, 4: gas generator,
5: collar,
6: inflow chamber,
7a, 7b: through-hole,
10: cylinder,
11: inside space,
12, 13: end,
14: cut-out portion,
15: inflow hole,
16: guide portion,
17: projection,
18: positioning portion,
20: piston,
21: inclined portion,
22: elastic ring,
23: ball,
24: connecting hole,
25: seal member,
26: set plate,
30: housing,
31: tubular portion,
32: holding portion,
33: opening,
34: insertion hole,
35: rib,
36: accommodating portion,
37: retaining projection,
38: groove,
39: positioning portion,
40: base,
41: fitting portion,
42: retaining portion,
43: guide portion,
44: passing hole,
45: protecting portion,
46: holding member,
50: connecting member,
51: connecting means,
52: detachment preventing member,
60: wire,
61: seat-belt connecting portion,
62: piston connecting portion,
63: folded portion,
64, 65: end,
70: detachment preventing member,
71: annular concave portion,
72: wall portion,
73: small-diameter portion,
100: seat belt device,
101: seat belt,
102: retractor,
103: seat belt guide,
104: tongue,
105: buckle,
106: shoulder belt,
107: lap belt,
110: occupant,
111: seat,
112: seat cushion, and
113: seat back.

The invention claimed is:

1. A pretensioner that is used in a vehicle seat belt device and pulls a seat belt, the pretensioner comprising:
a cylinder;
a gas generator that supplies gas into the cylinder;
a piston that is moved in the cylinder by the gas supplied from the gas generator;
a wire that is connected to the piston and the seat belt and pulls the seat belt when the piston moves; and
connecting means for connecting the wire to the piston, wherein
the wire has both ends that are connected to the seat belt and has a folded portion that is formed between the both ends and is connected to the piston, and
the connecting means includes a connecting hole that is formed in the piston and through which the folded portion of the wire passes, and includes a detachment preventing member positioned between the folded portion and the piston to prevent the folded portion from being detached from the connecting hole.

2. The pretensioner according to claim 1, wherein the detachment preventing member is disposed inside the folded-back portion of the wire and is caught by an end face of the piston or the inner surface of the connecting hole.

3. The pretensioner according to claim 1, wherein the detachment preventing member is formed of a ring-like member provided around the wire at the folded portion.

4. The pretensioner according to claim 1, wherein the detachment preventing member is formed of an inside member that is disposed inside the folded portion and has an annular concave portion in which the folded portion of the wire is disposed.

5. The pretensioner according to claim 1, wherein the connecting hole in the piston gradually expands toward a side where the detachment preventing member is disposed.

6. The pretensioner according to claim 1, wherein an edge of the connecting hole in the piston is formed in a curved surface.

7. A pretensioner that is used in a vehicle seat belt device and pulls a seat belt, the pretensioner comprising:
a cylinder;
a gas generator that supplies gas into the cylinder;
a housing that is fitted to the cylinder and includes a tubular portion, which is fitted to the outer circumference of the cylinder, and a holding portion, which holds the gas generator, the tubular portion and the holding portion being formed as an integral part;
a base including a fitting portion, which is fitted to the inner circumference of the cylinder, and a retaining portion, which retains the housing fitted to the cylinder, the fitting portion and the retaining portion being formed as an integral part;
a fixing member that fixes the base to a vehicle body;
a piston that is moved in the cylinder by the gas supplied from the gas generator; and
a connecting member that connects the seat belt and the piston and pulls the seat belt when the piston moves.

8. The pretensioner according to claim 7,
wherein through-holes are provided in the base and the cylinder in alignment when the fitting portion of the base is fitted to the inner circumference of the cylinder, and
the fixing member is attached to the vehicle body through the through-holes of the base and the cylinder as joining the base and the cylinder.

9. The pretensioner according to claim 7, wherein
the housing has an opening of the holding portion, the opening being formed in the inner circumference of the tubular portion, and
the cylinder has a gas inflow hole that is formed at a position matching the opening of the holding portion when the housing is fitted to the cylinder and through which the gas flowing out of the opening flows into.

10. The pretensioner according to claim 9, wherein
the tubular portion of the housing has an insertion hole, into which the gas generator is inserted, provided at a position facing the opening of the holding portion, and
the gas generator is inserted into the insertion hole in the tubular portion and is disposed in the holding portion, from the opening.

11. The pretensioner according to claim 10, wherein the holding portion of the housing includes an accommodating portion that accommodates the gas generator and a retaining projection that retains the gas generator.

12. The pretensioner according to claim 7, wherein the cylinder includes a guide portion that guides the retaining portion of the base until the retaining portion comes into contact with the housing fitted to the cylinder when the fitting portion of the base is inserted into the cylinder.

13. The pretensioner according to claim 7, wherein
the connecting member includes a wire that is pulled by the piston and pulls the seat belt, and
the wire is supported by the fixing member, between the piston and the seat belt.

14. The pretensioner according to claim 13, further comprising a holding member that is attached to the wire and the base to hold the wire along the base.

15. The pretensioner according to claim 7, wherein the cylinder and the housing have a pair of positioning portions, respectively, that fit together and are used to position the housing to be fitted to the cylinder.

16. The pretensioner according to claim 15, wherein
the positioning portion of the cylinder is formed of a projection provided on the outer circumference of the cylinder, and
the positioning portion of the housing is formed in the inner circumference of the tubular portion, the positioning portion being a groove that guides the projection on the cylinder and stops the projection inside the tubular portion.

* * * * *